United States Patent
Naohara et al.

(10) Patent No.: US 6,680,886 B1
(45) Date of Patent: Jan. 20, 2004

(54) LIQUID CRYSTAL TILT SERVO APPARATUS

(75) Inventors: Shinichi Naohara, Kawagoe (JP); Takeshi Sato, Kawagoe (JP); Hitoshi Yamazaki, Kawagoe (JP); Norio Matsuda, Kawagoe (JP); Morio Nozaki, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/548,264

(22) Filed: Apr. 12, 2000

(30) Foreign Application Priority Data

Apr. 14, 1999 (JP) ............................................ 11-106837

(51) Int. Cl.[7] .................................................. G11B 7/00
(52) U.S. Cl. .................................. 369/44.32; 369/53.19
(58) Field of Search .......................... 369/44.32, 53.19, 369/112.02, 53.18, 53.3, 53.35, 44.23

(56) References Cited

U.S. PATENT DOCUMENTS

| | | | |
|---|---|---|---|
| 5,886,496 A | 3/1999 | Furukawa et al. | 369/53.19 |
| 5,914,923 A * | 6/1999 | Araki et al. | 369/44.32 |
| 6,078,556 A | 6/2000 | Furukawa et al. | 369/53.19 |
| 6,137,754 A | 10/2000 | Furukawa et al. | 369/44.32 |
| 6,151,154 A | 11/2000 | Ogasawara et al. | 359/279 |
| 6,160,772 A | 12/2000 | Muramatsu | 369/44.32 |
| 6,414,917 B1 | 7/2002 | Buchler | 369/44.26 |
| 6,430,130 B1 * | 8/2002 | Furukawa | 369/44.32 |

FOREIGN PATENT DOCUMENTS

JP          10-172163          6/1998

* cited by examiner

*Primary Examiner*—Thang V. Tran
(74) *Attorney, Agent, or Firm*—Morgan, Lewis & Bockius LLP (57) ABSTRACT

A tilt servo apparatus of an optical disc recording/reproducing apparatus, which includes sampling portion for sampling an RF envelope signal at every predetermined rotational angle on the basis of a rotation signal being synchronous with a rotation of the optical recording medium, calculating portion for calculating an average value of the sampled envelope intensities, and control portion for controlling a tilt error correction. The control portion determines the amount of the tilt error correction on the basis of the average value.

10 Claims, 6 Drawing Sheets

FIG. 6

LIQUID CRYSTAL TILT SERVO APPARATUS

BACKGROUND OF THE INVENTION

The invention relates to a tilt servo apparatus of an optical disc recording/reproducing apparatus and, more particularly, to a liquid-crystal tilt servo apparatus having a liquid crystal device for correcting a tilt error.

Description of the Related Art

In a recording/reproducing apparatus of an optical disc such as CD (Compact Disc), DVD (Digital Versatile Disc), or the like, a deviation occurs between an optical axis of a laser beam irradiated from an optical pickup and a direction normal to the optical disc at the beam irradiating position due to a warp or the like of the optical disc. An angle of such deviation is called a tilt angle, and occurs mainly in the direction of radius of the optical disc (hereinafter, referred to as "radial direction"), and which causes a coma-aberration or the like of an optical system. When the tilt angle occurs, signal deterioration such as crosstalk to an adjacent track, jitter, or the like appears which exerts adverse influence on the reproducing quality of the optical disc. Since it is necessary to shorten a wavelength of the laser beam and to increase a numerical aperture NA of an objective lens in order to reduce a spot diameter of the laser beam, particularly, in such case as to perform a high density recording such as in a DVD system, a margin for the tilt angle decreases. Thus, the reproducing quality is greatly deteriorated even if the optical disc is slightly inclined. To correct an aberration due to the tilt angle during the reproduction of the optical disc, therefore, a disc player is generally provided with a tilt servo mechanism for correcting the tilt error on the basis of a detection signal intensity of the reflected laser beam.

As one of such tilt servo systems, there is a liquid-crystal tilt servo apparatus using a liquid crystal device. The principle of the liquid-crystal tilt servo is that a wave front aberration occurring due to a tilt of an optical disc can be compensated by controlling a liquid crystal, which is provided in the optical pickup, to cancel a phase change of the laser beam. A liquid-crystal tilt servo apparatus using a liquid crystal device for compensating the wave front aberration has been disclosed in Japanese Patent Application Kokai No. 10-172163 filed by the present applicant.

Generally, since a so-called surface oscillation occurs owing to a warp of an optical disc, an inclination of a turntable, or the like in an optical disc recording/reproducing apparatus, detection signal intensity fluctuates in accordance with a period of the surface oscillation. In the conventional tilt servo apparatus, however, there are such problems that accurate control cannot be performed and that a long convergence time is required for controlling an optical pickup to the optimum position since the servo control is performed on the basis of the detection signal having a fluctuation due to the surface oscillation.

OBJECTS AND SUMMARY OF THE INVENTION

The invention is made in consideration of the problems and it is an object of the present invention to provide a tilt servo apparatus which performs an accurate and stable tilt correction without being influenced by the surface oscillation of an optical disc.

A tilt servo apparatus according to the present invention comprises: photodetecting means for detecting a reflected light beam of a laser beam irradiated to an optical recording medium and for generating a detection signal, tilt error correcting means for correcting a tilt error occurring due to a tilt angle between an optical axis of the laser beam and a direction normal to the optical recording medium at the laser beam irradiating position, control means for controlling a correction amount of the tilt error correcting means, rotation signal generating means for generating a rotation signal synchronously with a rotation of a motor for rotating the optical recording medium, sampling means for executing a sampling of an envelope signal intensity of the detection signal at every predetermined rotational angle on the basis of the rotation signal; and calculating means for calculating an average value of the sampled envelope signal intensities. The control means determines the correction amount on the basis of the average value.

DETAILED DESCRIPTION OF THE PREFERRED EMBODIMENT

An embodiment of the present invention will now be described in detail with reference to the drawings. In the drawings which will be explained hereinbelow, substantially similar or equivalent portions are designated by the same reference numerals.

Figure 1:
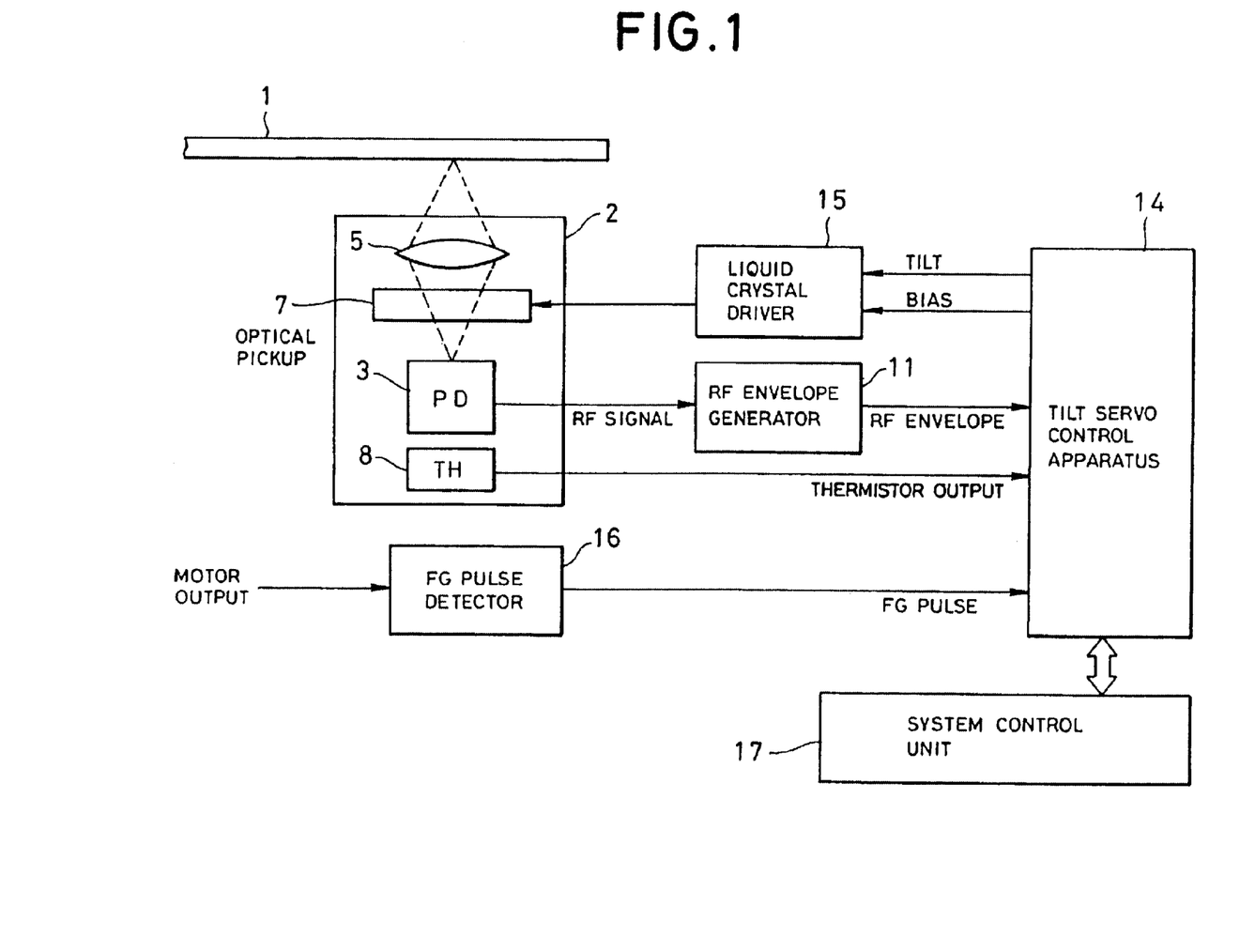
FIG. 1 is a block diagram schematically showing a configuration of a liquid-crystal tilt servo apparatus of an optical disc player according to an embodiment of the present invention.

FIG. 1 is a diagram schematically showing a configuration of a liquid-crystal tilt servo apparatus of an optical disc player according to an embodiment of the present invention. The apparatus comprises: an optical disc 1; an optical pickup 2; an RF envelope generator 11; a tilt servo control apparatus 14; a liquid crystal driving circuit 15; an FG pulse detecting circuit 16; and a system control unit 17. The optical pickup 2 includes: a photodetector 3; an objective lens 5; a liquid crystal device 7; and a thermistor 8.

A laser beam irradiated from a laser beam source (not shown) in the optical pickup 2 is reflected by the optical disc 1. The reflected light beam is detected by the photodetector 3. The detected RF signal is sent to the RF envelope generator 11. The liquid crystal device 7 is arranged in the optical pickup 2 on an optical axis of the laser beam. The liquid crystal device 7 corrects an aberration caused in an optical system. The RF envelope generator 11 receives the RF signal from the photodetector 3 and generates an RF envelope signal. The RF envelope generator 11 transmits the RF envelope signal to the tilt servo control apparatus 14. An output indicating an environmental temperature of the optical pickup 2 is supplied from the thermistor 8 to the tilt servo control apparatus 14. The tilt servo control apparatus 14 sends a data control signal for correcting a tilt error, i.e., a tilt control signal and a bias control signal, to the liquid crystal driving circuit 15 on the basis of the foregoing RF envelope intensity signal (hereinafter, simply referred to as Envelope intensity signal) and the environmental temperature.

The liquid crystal device 7, consequently, varies a phase difference of the light beam passing through the liquid crystal device 7 and serves as tilt error correcting means by correcting an aberration. The system control unit 17 controls the tilt servo control apparatus 14 so as to perform an optimum tilt servo. The tilt servo control apparatus 14 and system control unit 17 serves as tilt error correction control means.

Figure 2A:
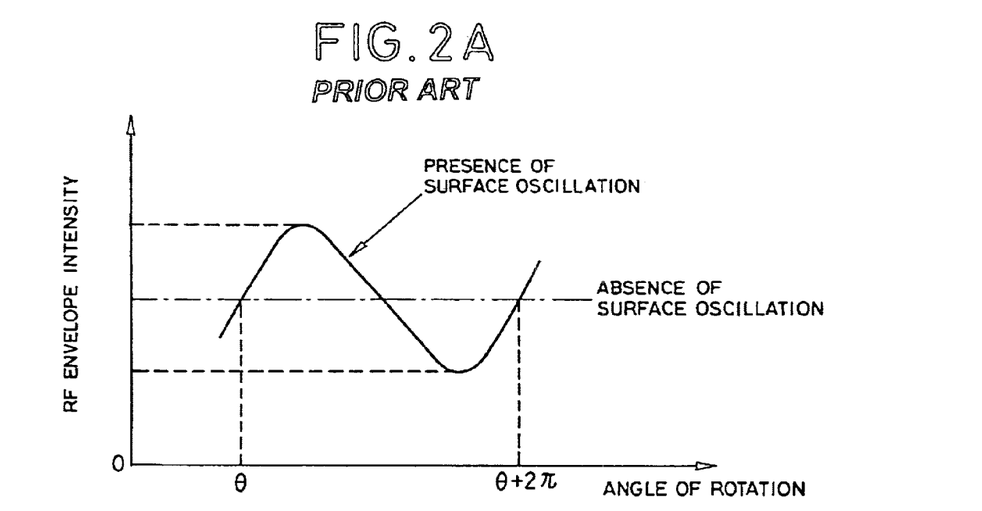
FIGS. 2A and 2B are diagrams for illustrating a tilt error correction in a conventional tilt servo apparatus.
Figure 2B:
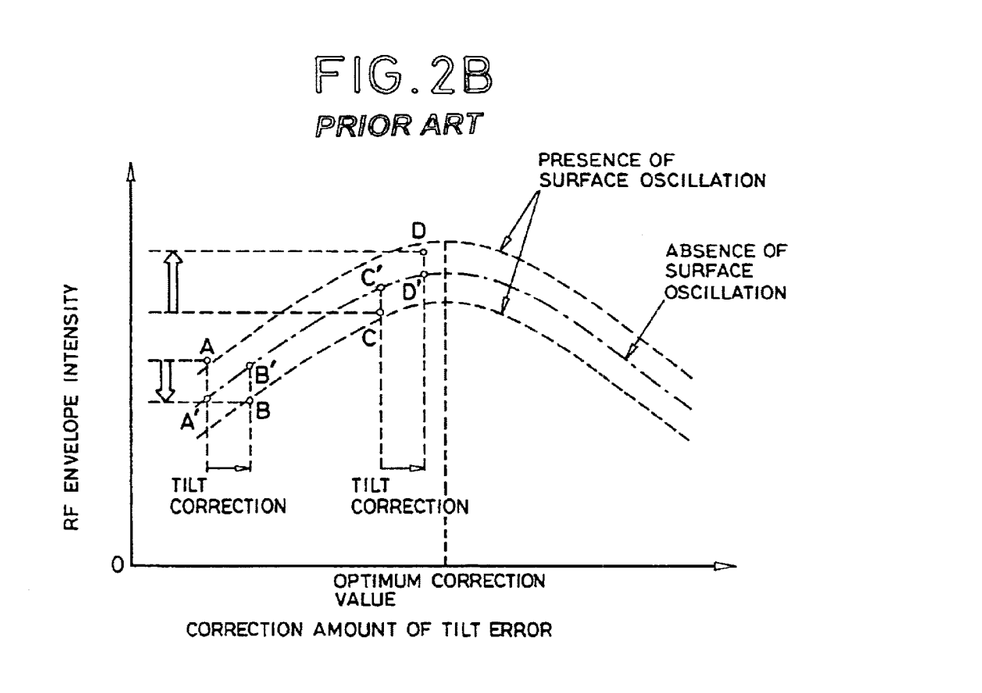

FIGS. 2A and 2B are diagrams for illustrating a tilt error correction in the conventional tilt servo apparatus. FIG. 2A is a diagram showing an RF envelope intensity for a rotational angle of the optical disc when an amount of tilt error correction is set to a constant value. Since the tilt error correction amount is constant, the envelope intensity ought to be constant unless there is a surface oscillation. When there is a surface oscillation, however, as shown by a solid line in the diagram, the envelope intensity fluctuates with periodicity of one rotation of the optical disc. As shown in FIG. 2B, therefore, the envelope intensity fluctuates within a fluctuation width shown by a broken line for the tilt error correction amount. Although there are various methods of controlling the tilt error correction value to the optimum value, it is difficult to accurately perform the tilt error correction if there is a fluctuation of the envelope intensity as mentioned above. For example, even when the tilt error correction amount is changed in the direction of the correction optimum value (from point A to point B in the diagram), there will be a case where a detection value (point B) of the envelope intensity after the change is smaller than a detection value (point A) before the change owing to the fluctuation of the envelope intensity. Since the detection value of the envelope intensity decreases owing to the fluctuation, the correction operation is controlled to be in the opposite direction at the next correction step, i.e., in the direction so as to be away from the optimum correction value. When there is no surface oscillation (between A' and B'), the next correction operation is controlled correctly in the same direction, i.e., toward the optimum value since the envelope intensity increases. For example, even in the case where the tilt error correction amount is changed to the direction of the optimum correction value (from point C to point D in FIG. 2B) and a detection value (point D) of the envelope intensity after the change is larger than a detection value (point C) before the change, the next correction operation is controlled to perform a correction more than it is needed if a difference between the envelope intensities is larger than an envelope intensity change when there is no surface oscillation (between C' and D'). A problem, therefore, arises such that the control is largely deviated from the optimum correction value due to the surface oscillation of the optical disc, an oscillating correction operation occurs around the optimum correction value, or it takes time for convergence.

Figure 3:
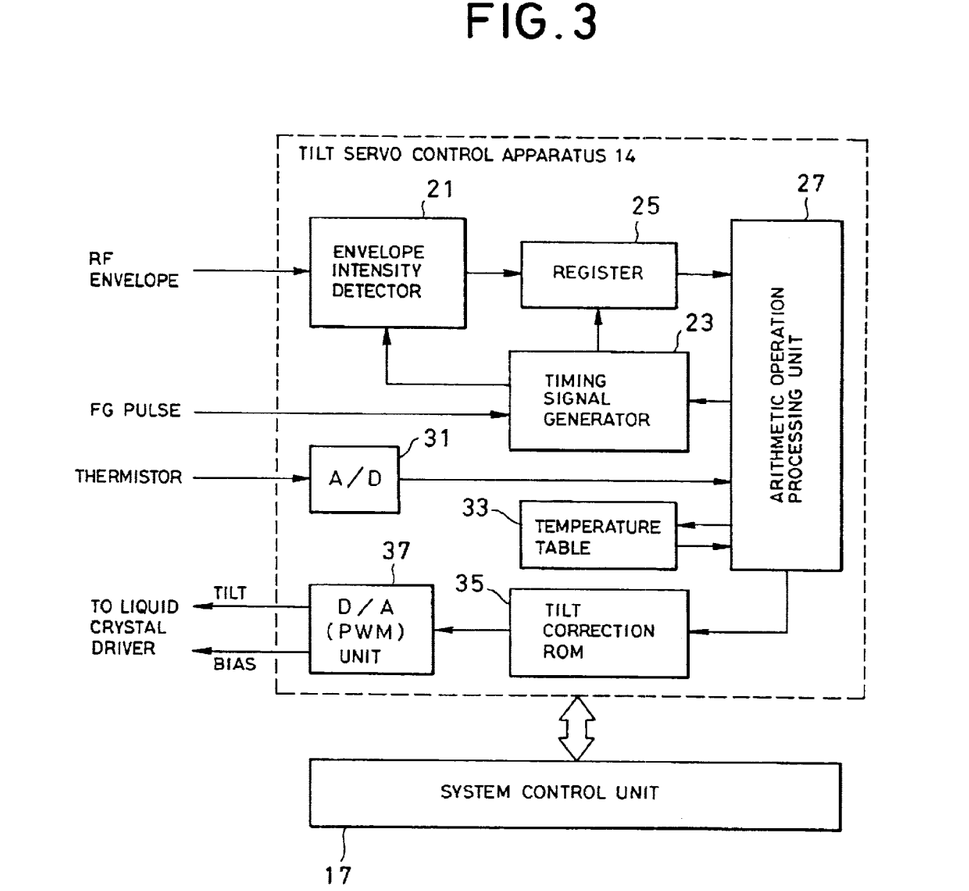
FIG. 3 is a block diagram schematically showing a configuration of a liquid-crystal tilt servo control apparatus according to the embodiment of the present invention.

FIG. 3 is a diagram schematically showing a configuration of a liquid crystal tilt servo control apparatus according to an embodiment of the present invention which was made to solve the problems.

The operation of the liquid crystal tilt servo control apparatus 14 will now be described with reference to FIG. 3.

An RF envelope intensity detector 21 receives the RF envelope signal generated by the RF envelope generator 11 and fetches the envelope intensity from the RF envelope signal (hereinafter, simply referred to as envelope intensity) in response to a timing signal which is generated in a timing signal generator 23. The RF envelope intensity detector 21 has an analog/digital (A/D) converter (not shown), performs a predetermined process such as addition, averaging, or the like, which will be explained later, to the digital envelope intensity value, and thereafter, supplies the resultant envelope intensity value to a register 25. The timing signal generator 23 generates a timing signal and sends it to each unit in response to a control signal from an operation processing unit 27. The timing signal includes a sampling signal synchronized with an FG pulse supplied from the FG pulse detecting circuit 16 and a data transmission command signal to the register 25. The FG pulse is a rotation signal synchronized with the rotation of a spindle motor for rotating the optical disc. The FG pulse is constructed by a pulse train in which a predetermined rotational angle obtained by dividing one rotation of the optical disc into N equal portions (N is an integer) is set to one period. The register 25 supplies the Envelope intensity value to the operation processing unit 27 in response to the transmission command signal from the timing signal generator 23.

The operation processing unit 27 executes a control of each component element in the liquid crystal tilt servo control apparatus 14 in cooperation with the system control unit 17 mentioned above. The operation processing unit 27 executes processes such as arithmetic operation, discrimination, and the like by using each value of the envelope intensity supplied from the register 25. The operation processing unit 27 receives a temperature signal which was supplied from the thermistor 8 and converted into a digital signal by an A/D converter 31. The operation processing unit 27 controls the timing signal generator 23, a temperature table memory 33, and a tilt correction ROM 35 on the basis of the temperature signal, and transmits and/or receives data to/from these components. Data corresponding to a temperature fluctuation such as phase characteristics, response characteristics, and the like of the liquid crystal is stored in the temperature table memory 33. Data such as a liquid crystal driving amount and the like for phase correction according to temperature characteristics of the liquid crystal is stored in the tilt correction ROM 35. For example, liquid crystal driving amounts at every tilt angle of 0.1° have sequentially been stored in addresses in the tilt correction ROM 35 in correspondence to various environmental temperatures. The operation processing unit 27 controls the timing signal generator 23 so as to generate a timing signal according to the environmental temperature of the liquid crystal with reference to the temperature table memory 33. The operation processing unit 27 transmits a control signal for designating a liquid crystal driving amount according to the environmental temperature of the liquid crystal, for example, an address designation signal in the above example to the tilt correction ROM 35. The data extracted from the tilt correction ROM 35 is converted to a D/A (digital/analog) or PWM (Pulse Width Modulation) signal which indicates the liquid crystal driving amount (i.e., tilt, bias) in a D/A (PWM) unit 37 and is supplied to the liquid crystal driving circuit 15.

The tilt error correction control in the embodiment will now be described in detail with reference to flowcharts shown in FIGS. 4 and 5 and FIG. 6.

Figure 4:
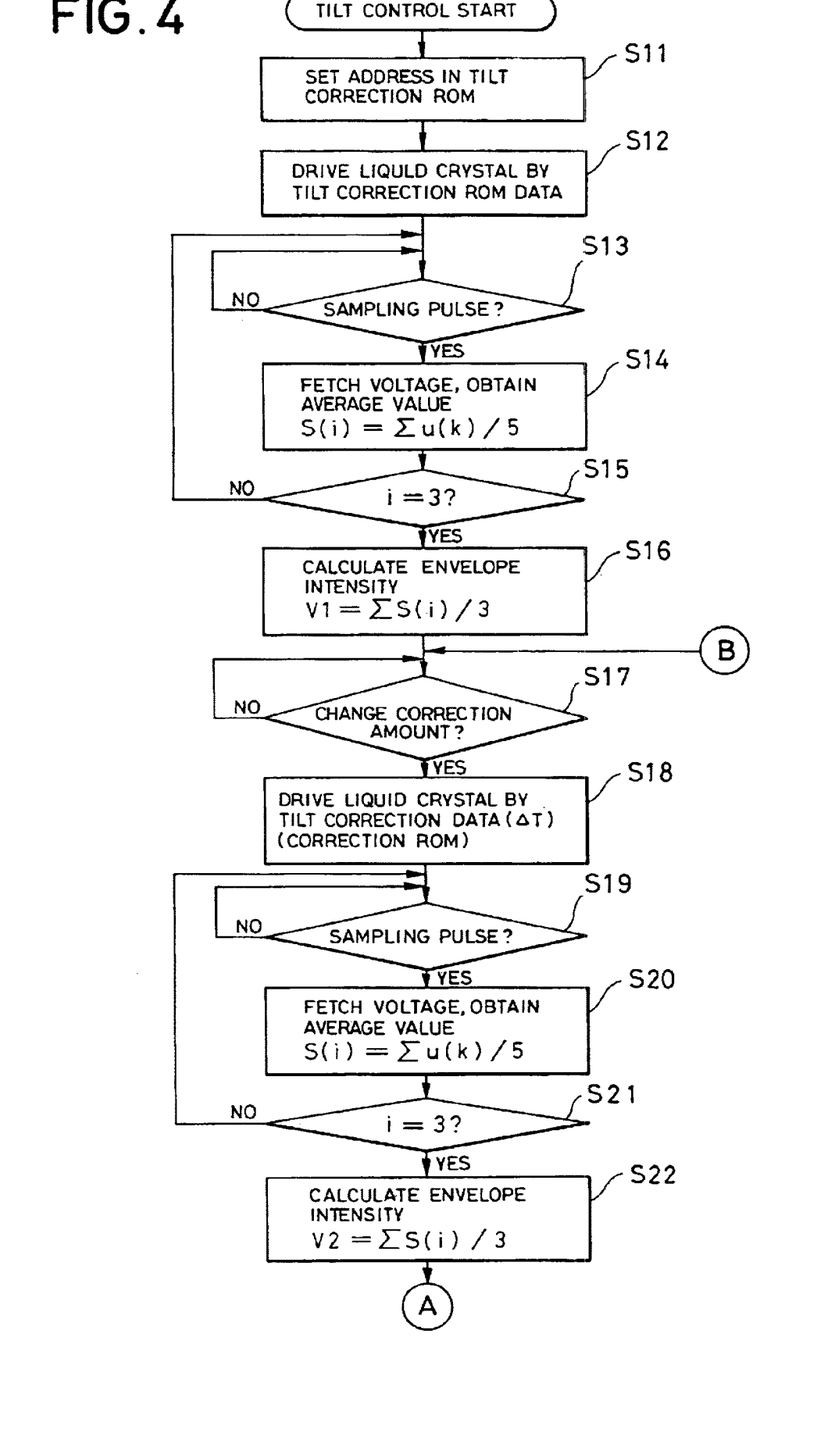
FIG. 4 is a flowchart showing an operating procedure of the tilt servo control apparatus of the present invention.
Figure 5:
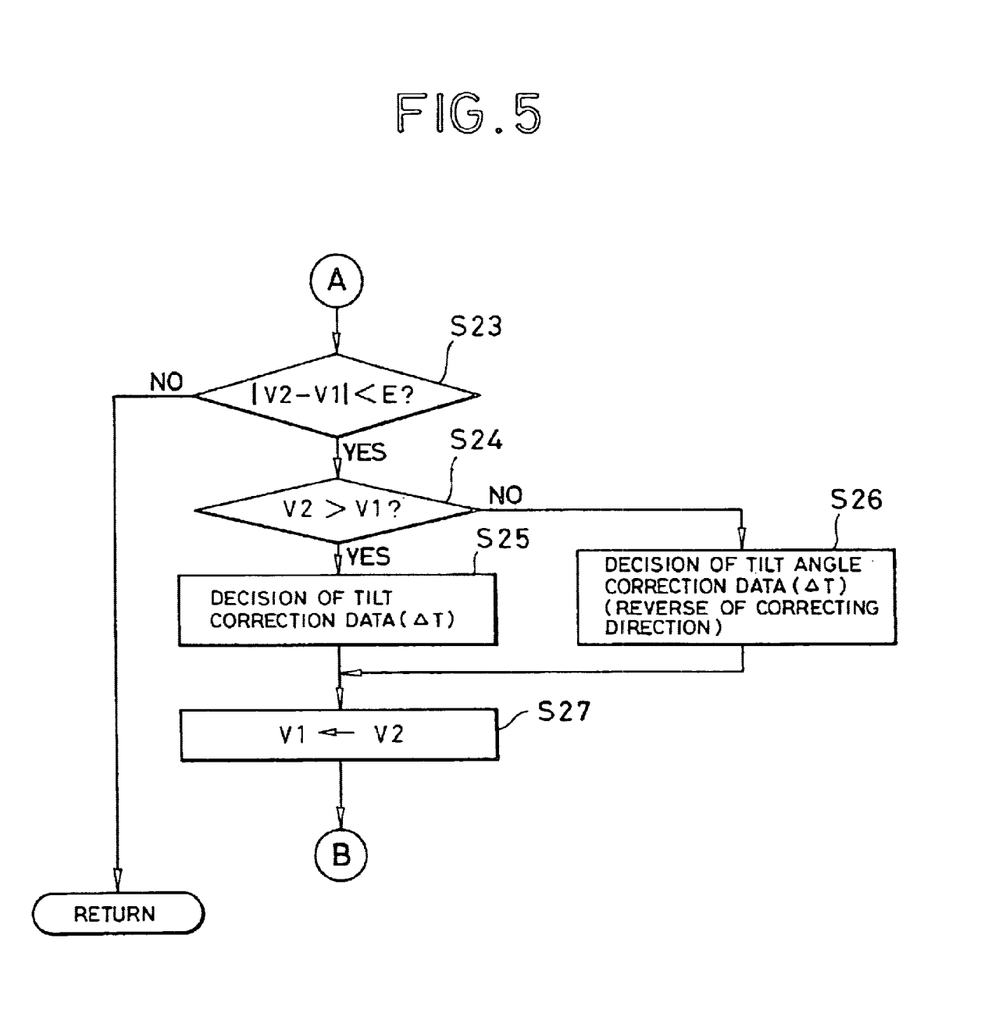
FIG. 5 is a flowchart showing an operating procedure of the tilt servo control apparatus of the present invention.
Figure 6:
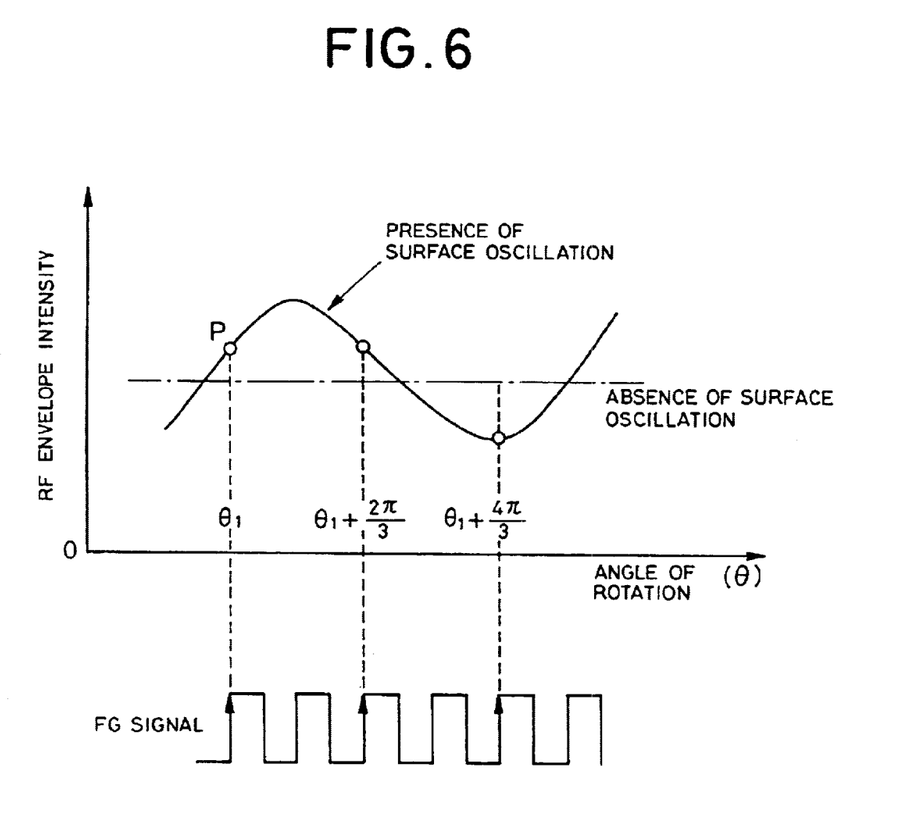
FIG. 6 is a diagram for illustrating a sampling which is executed by the tilt servo control apparatus of the present invention.

The operation shown in the flowcharts of FIGS. 4 and 5 is executed by, for example, an interrupting process for instructing the start of a tilt servo by the system control unit 17 during the recording or reproduction of the optical disc 1.

First, the operation processing unit 27 designates a predetermined address at the start of the tilt servo for the tilt correction ROM (step S11). The tilt correction data in the designated address is D/A (PWM) converted and supplied to the liquid crystal driving circuit 15. The liquid crystal is driven by the tilt error correction amount according to the converted tilt correction data (step S12).

In a state where the tilt error correction amount is held constant, the envelope intensity is sampled a plurality of times and the obtained sampling values are averaged, thereby canceling a fluctuation of the envelope intensity which is caused by a surface oscillation of the optical disc. An example of sampling three times per rotation of the optical disc (i.e., sampling at an angle obtained by dividing one rotation into three parts) as shown in FIG. 6 will be described hereinbelow. First, the presence or absence of a sampling instruction signal to instruct the sampling is discriminated (step S13). When there is the sampling instruction signal, a voltage showing the envelope intensity is fetched. In this example, the voltage is fetched a plurality of times, for example, 5 times in order to remove noises included in the envelope intensity signal, thereby obtaining an average value S(1) (step S14). S(1), therefore, indicates the sampling value of the first time. As described above and as shown in FIG. 6, the sampling instruction signal is generated each time a predetermined number of pulse leading edges of the FG signal are detected. Whether the sampling of three times has been finished or not is discriminated (step S15). If YES, the average value V1=(S(1)+S(2)+S(3))/3 of the obtained sampling values is calculated (step S16). That is, the averaged envelope intensity V1 is set to the envelope intensity in the current tilt error correction amount and the tilt servo is performed. Although the arithmetic average value of the sampling values has been used here, the sum of them can also be used.

Subsequently, the presence or absence of the correction amount change instruction signal is discriminated (step S17). If there is the correction amount change instruction, the liquid crystal is driven by predetermined tilt correction data ($\Delta T$) from the tilt correction ROM (step S18). Further, the presence or absence of the sampling instruction signal is discriminated (step S19). A procedure similar to that executed in steps S13 to S16 is executed, thereby calculating an average value V2 (steps S19 to S22). The absolute value of a difference between the envelope intensities V1 and V2 (before and after the change of the tilt correction amount) obtained by the execution in the above processing steps is compared with a predetermined small value E. The predetermined small value E is a threshold value to discriminate whether the envelope intensity is the maximum, namely, whether the tilt correction amount is the optimum value or not. When the absolute value of the difference between the envelope intensities V1 and V2 is smaller than the threshold value E, control returns to the main routine. If it is larger than the threshold value E, the magnitudes of V1 and V2 are further compared (step S24). If V2 is larger than V1, tilt correction data ($\Delta T$) indicating the tilt correction amount according to the difference and the temperature response characteristics of the liquid crystal is determined (step S25). When V2 is smaller than V1, the tilt correction data ($\Delta T$) is determined on the basis of the difference, the temperature response characteristics of the liquid crystal, and that the correcting direction should be reversed or not (step S26). Subsequently, the envelope intensity V2 after the tilt correction is newly replaced with V1 (step S27). Processing, then, returns to step S17. The procedure for the change of the tilt correction amount and the comparison of the magnitudes of the envelope intensities is repeated until the optimum tilt correction is performed. The tilt correction control is executed by the above procedure.

As described in detail above, according to the present invention, the tilt servo apparatus which performs the accurate and stable tilt correction can be realized irrespective of the surface oscillation, since the sampling is performed so as to cancel the surface oscillation of the optical disc. Since the sampling for removing the surface oscillating component can be executed even within the temperature response time of the liquid crystal, there is no need to have a surplus response time for sampling.

In the above procedure, the timing of the sampling signal is determined in accordance with the temperature response characteristics of the liquid crystal. That is, in a certain tilt correction amount, in the case of N-times sampling (N is an integer of 2 or more) and determining the envelope intensity with the average value of the sampling values, the N-times sampling is completed within the response time of the liquid crystal. The timing for starting the sampling of N times, namely, the sampling of the first time can be determined in accordance with the temperature response characteristics of the liquid crystal, namely, in a manner such that a calculation error of the envelope intensity due to the response delay decreases. For example, when a response of the liquid crystal is slow (for example, a delay time of about 100 msec) at a low temperature, it is desirable to delay the start of sampling as compared with that at an ordinary temperature of a fast response (for example, a delay time of about tens of msec).

Further, the number of sampling times can also be determined in accordance with the temperature response characteristics of the liquid crystal. When the response of the liquid crystal is slow, it is possible to reduce a calculation error of the envelope intensity due to the response delay by increasing the number of sampling times.

Although the embodiment has been described on the assumption that the tilt servo control apparatus is constructed by hardware, it can be constructed by using, for example, a one-chip IC or can also be realized by software or the like of a microcomputer.

As will be obviously understood from the above description, according to the present invention, by sampling the tilt detection signal so as to cancel the surface oscillation of the optical disc, the tilt servo apparatus which can perform the accurate and stable tilt correction even if there is a surface oscillation of the optical disc can be realized.

The invention has been described with reference to the preferred embodiments thereof. It should be understood by those skilled in the art that a variety of alternations and modifications may be made from the embodiments described above. It is therefore contemplated that the appended claims encompass all such alternations and modifications.

What is claimed is:

1. A tilt servo apparatus of an optical disc recording/reproducing apparatus, comprising:

photodetecting means for detecting a reflected light beam of a laser beam irradiated to an optical recording medium and for generating a detection signal;

tilt error correcting means for correcting a tilt error occurring due to a tilt angle between an optical axis of said laser beam and a direction normal to said optical recording medium at said laser beam irradiating position;

control means for controlling a correction amount of said tilt error correcting means;

rotation signal generating means for generating a rotation signal synchronously with a rotation of a motor for rotating said optical recording medium;

sampling means for executing a sampling of an envelope signal intensity of said detection signal at every predetermined rotation angle of said optical recording medium on the basis of said rotation signal to generate sampled envelope signal intensities, the predetermined rotation angle corresponding to one-Nth rotation of said optical recording medium, where N is an integer greater than or equal to two; and calculating means for calculating an average value of the sampled envelope signal intensities, wherein said control means determines said correction amount on the basis of said average value.

2. An apparatus according to claim 1, wherein said tilt error correcting means is a liquid crystal device for aberration correction arranged on the optical axis of said laser beam, and the control signal of said control means is a driving signal of said liquid crystal device.

3. An apparatus according to claim 2, further comprising:

temperature detecting means for detecting a temperature of an environment where said liquid crystal device is arranged; and response characteristics storing means for storing a response delay time due to a temperature of said liquid crystal device, wherein said sampling means executes the sampling within the response delay time of said liquid crystal device.

4. An apparatus according to claim 3, wherein said sampling means starts the sampling on the basis of the response delay time of said liquid crystal device.

5. An apparatus according to claim 1, wherein the number of the sampled envelope signal intensities is determined on the basis of the response delay time of said tilt error correcting means.

6. A tilt servo apparatus of an optical disc recording/reproducing apparatus, comprising:

a photodetector which detects a reflected light beam of a laser beam irradiated to an optical recording medium and for generating a detection signal;

a tilt error correcting portion which corrects a tilt error occurring due to a tilt angle between an optical axis of said laser beam and a direction normal to said optical recording medium at said laser beam irradiating position;

a controller which controls a correction amount of said tilt error correcting portion;

a rotation signal generator which generates a rotation signal synchronously with a rotation of a motor for rotating said optical recording medium;

a sampling portion which executes a sampling of an envelope signal intensity of said detection signal at every predetermined rotation angle of said optical recording medium on the basis of said rotation signal to generate sampled envelope signal intensities, the predetermined rotation angle corresponding to one-Nth rotation of said optical recording medium, where N is an integer greater than or equal to two; and a calculator which calculates an average value of the sampled envelope signal intensities, wherein said controller determines said correction amount on the basis of said average value.

7. An apparatus according to claim 6, wherein said tilt error correcting portion is a liquid crystal device for aberration correction arranged on the optical axis of said laser beam, and the control signal of said controller is a driving signal of said liquid crystal device.

8. An apparatus according to claim 7, further comprising:

a temperature detector which detects a temperature of an environment where said liquid crystal device is arranged; and a response characteristics storing portion which stores a response delay time due to a temperature of said liquid crystal device, wherein said sampling portion executes the sampling within the response delay time of said liquid crystal device.

9. An apparatus according to claim 8, wherein said sampling portion starts the sampling on the basis of the response delay time of said liquid crystal device.

10. An apparatus according to claim 6, wherein the number of the sampled envelope signal intensities is determined on the basis of the response delay time of said tilt error correcting portion.

* * * * *